(12) United States Patent
Holzmann et al.

(10) Patent No.: US 7,038,629 B2
(45) Date of Patent: May 2, 2006

(54) ANTENNA COUPLER

(75) Inventors: Gottfried Holzmann, Zorneding (DE); Martin Roth, Starnberg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 8 days.

(21) Appl. No.: 10/481,101

(22) PCT Filed: May 6, 2002

(86) PCT No.: PCT/EP02/04979

§ 371 (c)(1),
(2), (4) Date: Jun. 25, 2004

(87) PCT Pub. No.: WO02/103840

PCT Pub. Date: Dec. 27, 2002

(65) Prior Publication Data
US 2004/0233114 A1 Nov. 25, 2004

(30) Foreign Application Priority Data
Jun. 19, 2001 (DE) ................ 101 29 408

(51) Int. Cl.
*G01R 29/10* (2006.01)
(52) U.S. Cl. ................ 343/703; 343/906; 455/67.11
(58) Field of Classification Search ............... 343/703, 343/702, 906; 455/67.11, 425
See application file for complete search history.

(56) References Cited

U.S. PATENT DOCUMENTS

| | | | |
|---|---|---|---|
| 5,777,585 A | 7/1998 | Tsuda et al. ............... 343/702 |
| 5,852,421 A | 12/1998 | Maldonado ............... 343/702 |
| 6,229,490 B1 * | 5/2001 | Hofmann .................. 343/702 |
| 6,915,111 B1 * | 7/2005 | Chen et al. ............... 455/67.11 |

FOREIGN PATENT DOCUMENTS

| | | |
|---|---|---|
| DE | 197 17 834 A1 | 10/1998 |
| DE | 197 32 639 C1 | 1/1999 |
| EP | 0 955 549 A1 | 11/1999 |
| EP | 0 999 607 A2 | 5/2000 |

* cited by examiner

*Primary Examiner*—Hoang V. Nguyen
(74) *Attorney, Agent, or Firm*—Christensen O'Connor Johnson Kindness, PLLC

(57) ABSTRACT

The invention relates to an antenna coupler (1) for testing mobile transmitters and/or receivers, in particular mobile telephones (2). Said coupler has a receiving element (4) and/or a bearing surface (20) for the mobile transmitter and/or receiver and at least one antenna element (5, 25, 35). According to the invention, the antenna element (5, 25, 35) is configured as a loop that is essentially closed in spatial terms.

12 Claims, 3 Drawing Sheets

ANTENNA COUPLER

This application is a 371 of PCT/EP02/04979 dated 6 May 2002.

The invention relates to an antenna coupler for testing transmitters and/or receivers, especially mobile telephones or devices which operate according to the blue-tooth standard.

An antenna coupler for testing mobile telephones is already known from DE 197 32 639 C1. With the known antenna coupler, a receiving element for a mobile telephone is attached to a printed board. In particular, a linear antenna, which acts as a dipole antenna, is formed on the printed-circuit board using stripline technology. One essential property of an antenna coupler is the coupling factor, which indicates the ratio of the power received relative to the total power transmitted. Because the known arrangement responds in a very sensitive manner to changes of position of the antenna of the mobile telephone, the coupling factor for every type of mobile telephone attached to the receiving element is different.

The object of the invention is therefore to provide an antenna coupler, which is independent of changes of position of the antenna of the transmitter and/or receiver, and which, because of the unified coupling factor, is suitable for testing an extremely diverse range of transmitters and/or receivers.

This object is achieved by an antenna coupler with the features of claim 1. Advantageous further embodiments of the invention are indicated in the dependent claims.

According to the invention, the antenna element is designed as a loop which is substantially closed in spatial terms. In addition to the electrical components of the field transmitted by the mobile telephone, the magnetic component is therefore also registered. Conversely, transmission to the mobile telephone is also improved.

The term mobile telephone is used in this context and in the following paragraphs as a potential application. The invention is also suitable for any transmitter and/or receiver other than the mobile telephone, for example, transmitters and/or receivers which operate according to the blue-tooth principle. The coupling factor of the antenna coupler according to the invention is largely independent of the exact position of the mobile telephone relative to the antenna element. Accordingly, a mobile telephone, for which the exact position of the antenna is not known at least from the outside, can also be tested without the need for specific adaptation with reference to spatial orientation and position.

Furthermore, it is advantageous if the loop is arranged substantially in a plane, which is orientated parallel to a reflector plate. Accordingly, the forward/reverse relationship of the antenna coupler is decisively improved.

It is also advantageous if another antenna element is provided, which is designed in such a manner that it is suitable for transmission of the same frequency as the first antenna element, and if the feeding point of the other antenna element is arranged relative to the feeding point of the first antenna element with an offset of at least substantially 90°. Accordingly, the antenna coupler can receive via the first antenna and at the same time transmit via the other antenna thereby achieving a maximum phase decoupling in order to avoid mutual influence.

The invention will be explained in greater detail below with reference to the drawings. The drawings are as follows.

Figure 1:
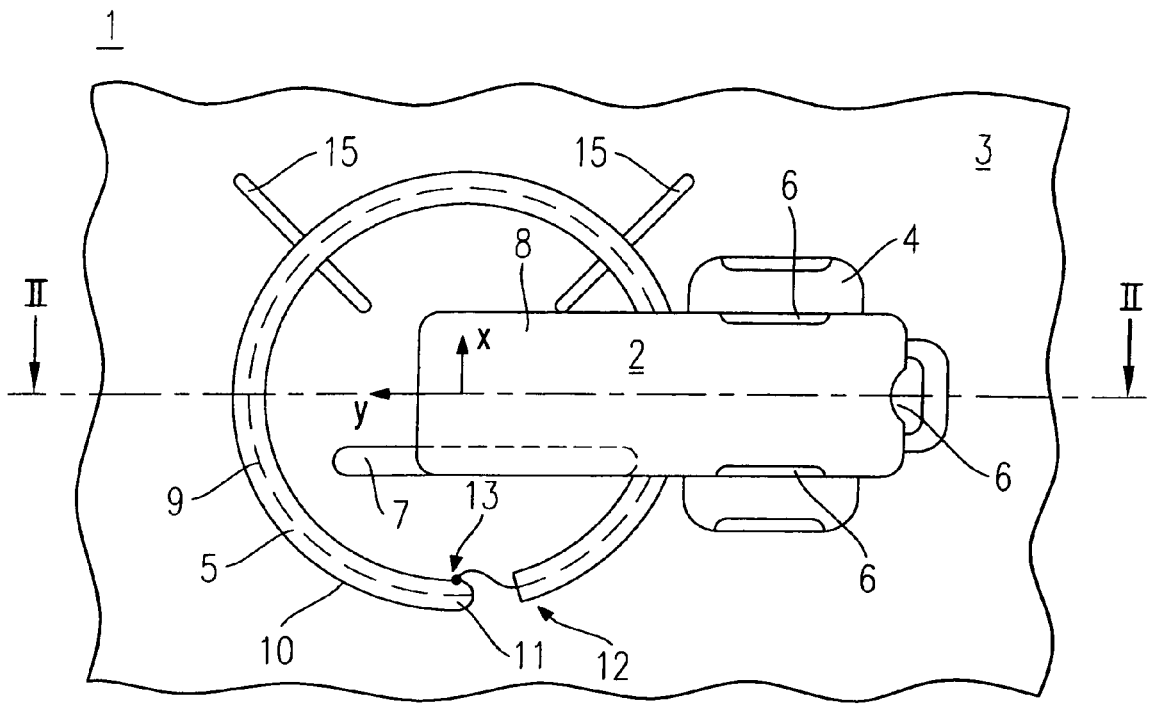
FIG. 1 shows a plan view of the first exemplary embodiment of an antenna coupler.

FIG. 1 shows a plan view of an antenna coupler 1 according to a first exemplary embodiment of the invention. The antenna coupler 1 is used for testing a mobile telephone 2. For this purpose, the mobile telephone 2 is positioned over an antenna element 5 by means of a receiving element 4 of the antenna coupler attached to a reflector plate 3. In this context, a defined position is determined by the receiving element 4, and any movement of the mobile telephone 2 during the implementation of the measurements is prevented. In particular, the receiving element 4 provides several locking elements 6 in order to secure the attachment of the mobile telephone 2.

The antenna 7 of the mobile telephone 2, which is shown in the interior of the mobile telephone 2 as a broken line, is arranged above the antenna elements 5 by this attachment. Since the exact position of the antenna 7 cannot readily be determined from the outside, an exactly centred arrangement of the antenna 7 above the antenna element 5 is only possible with difficulty, that is, only by means of an awkward adjustment. This situation becomes more difficult if mobile telephones 2 are used in which the antenna 7 is accommodated completely inside the housing 8 of the mobile telephone 2. It is particularly difficult, if an accurate spatial adjustment must be implemented for different mobile telephones 2 because the receiving element 4 would then have to be movable. The present invention avoids the problems named because the coupling factor between the antenna element 5 and the antenna 7 is largely independent of the exact geometrical arrangement of the antenna 7 of the mobile telephone 2 relative to the antenna element 5.

The antenna element 5 provides an inner conductor 9 represented in FIG. 1 by a broken line and an outer conductor 10 surrounding the inner conductor 5, wherein the outer conductor 10 shields the inner conductor 9. A dielectric can be provided between the two conductors 9, 10. The outer conductor 10 preferably encloses the circumference of the inner conductor 9 in the form of a cylindrical casing shield. The antenna element 5 is designed as a loop which is substantially closed in spatial terms, the smallest possible distance being provided between the first feeding point 11 and the one end 12 of the antenna element 5. The inner conductor 9 emerges from the outer conductor 10 at the end 12 of the antenna element 5. The exposed inner conductor 9 runs to the outer conductor 10 in the region 13 of the feeding point 11, in order to establish an electrical contact between the two conductors. The region 13 is preferably disposed in the proximity of the feeding point 11.

Figure 2:
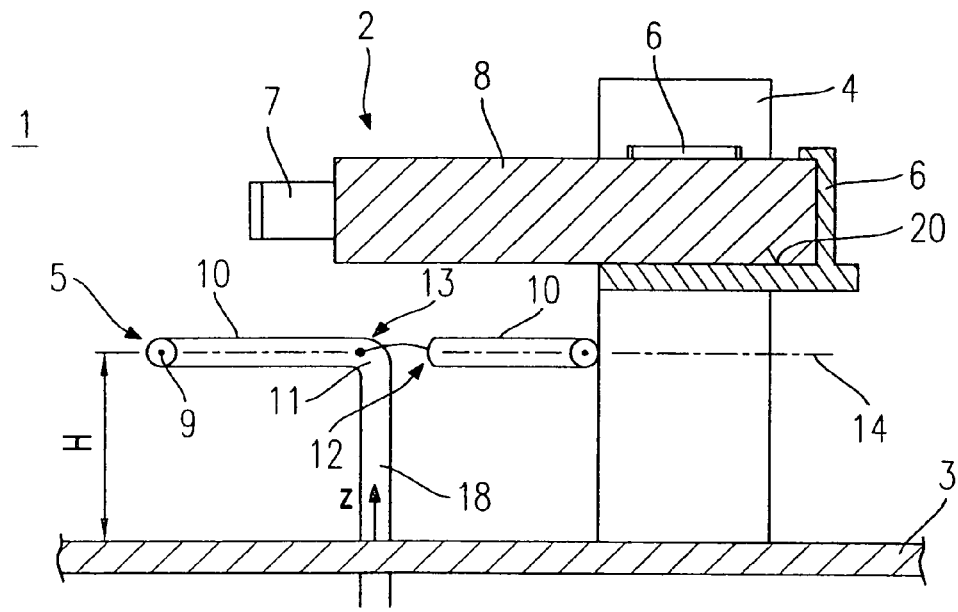
FIG. 2 shows a section along the line II from FIG. 1.

The antenna element 5 is arranged in a plane 14, which is shown in FIG. 2. For this purpose, holders 15 made from Teflon, for example, are used to hold the antenna element 5 relative to the feeding point 11.

Since the antenna element 5, which is designed as a closed loop, measures the electrical component transmitted from the antenna 7, which is orientated in the y-direction, and also the magnetic component of the electrical field, which is orientated perpendicular to the plane 14, there is a considerable degree of independence in positioning the mobile telephone 2 and/or the antenna 7 of the mobile telephone 2 in the x-direction and the y-direction. This also applies in a corresponding manner for transmission from the antenna element 5 to the antenna 7 of the mobile telephone.

The circumference of the antenna element 5 arranged in a circular shape in FIG. 1, corresponds substantially to the mean wavelength λ transmitted and/or received by the antenna element 5 thereby achieving an advantageous transmission and receiving characteristic. An excellent forward/reverse relationship is also achieved by fitting the antenna element 5 above the reflector plate 3, which is designed as a reflector. The arrangement consists of a total of four dipoles, wherein the half loop at the feeding point represents a first λ/2 dipole, and the half loop opposite the feeding point represents a second λ/2-dipole and two further λ/2-dipoles are reflected virtually by the reflector plate 3.

Moreover, the height H, at which the antenna element 5 is arranged above the reflector plate 3 is also shown in FIG. 2 in the section illustrated along the lines marked II in FIG. 1. In this context, the height H is equal to one eighth of the wavelength λ, to which the antenna element 5 is tuned. For a mean frequency of 2.45 GHz, this results in a developed length of the antenna element 5 of approximately 12 cm and a height H of approximately 1.5 cm.

As a result of the homogeneous field behaviour achieved in the z-direction, any variation in height of the antenna 7, determined, for example, structurally, is largely without influence on the coupling factor achieved.

Figure 3:
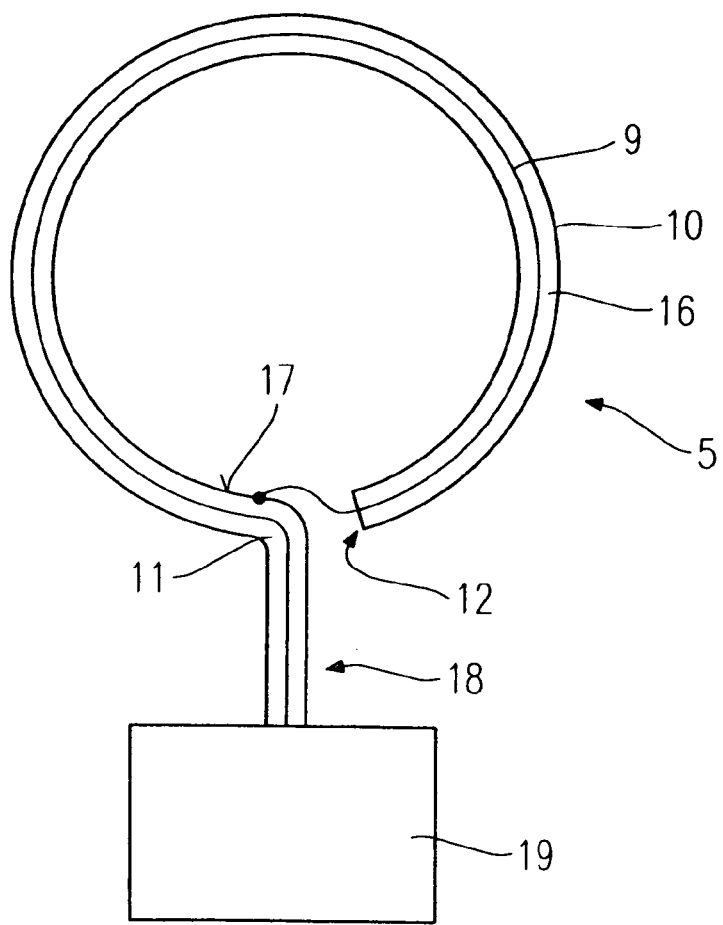
FIG. 3 shows a schematic view of the antenna element together with a measuring device according to the first exemplary embodiment.

FIG. 3 shows a sketch diagram of an antenna coupler together with a measuring arrangement according to the first exemplary embodiment. The antenna element 5, which is curved to form a substantially closed loop shape, provides an outer conductor 10 and an inner conductor 9, between which a dielectric 16 is provided. At the end 12 of the antenna element 5, the inner conductor 9 runs to the portion 17 of the outer conductor 10 nearest to the feeding point 11 thereby establishing an electrical contact between the conductors. The antenna element 5 is connected via the connecting piece 18 to a measuring device 19, wherein, as shown in FIG. 2, the connecting piece 18 supports the antenna element 5 relative to the reflector plate 3 in the region of the feeding point 11.

Figure 4:
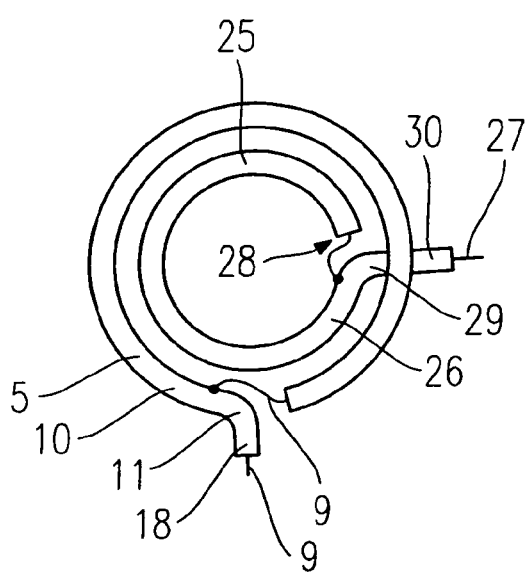
FIG. 4 shows a schematic view of two antenna elements according to a second exemplary embodiment.

FIG. 4 shows the basic structure of a second exemplary embodiment of the invention. To avoid repetitive description, comparable elements in this and in all of the other drawings are marked with comparable reference numbers.

According to the second exemplary embodiment, a first antenna element 5 is provided which corresponds to the antenna element 5 of the first exemplary embodiment. Moreover, a second antenna element 25 is provided, which has essentially the same structure as the first antenna element 5. The second antenna element 25 therefore provides an outer conductor 26, an inner conductor 27 and a free end 28. As in the case of antenna element 5, the inner conductor 27 runs to the outer conductor 26 in the region of the feeding point 29 of the antenna element 25 in order to establish electrical contact. A connecting piece 30 is also provided, which, together with two holders, which are not illustrated, and which correspond to the holders 15, supports the antenna element 25 above a common reflector plate 3.

In the second exemplary embodiment of the invention, the antenna element 25 is supposed to provide approximately the same transmission characteristics as the antenna element 5 apart from the polarisation. For reasons of space, the antenna element 25 is arranged inside the antenna element 5, so that its developed length is shorter than that of the antenna element 5. However, in order to achieve a good transmission characteristic for both antenna elements 5,25, relative to a mean wavelength, the antenna element 5 can provide a somewhat larger circumference and the antenna element 25 can provide a somewhat smaller circumference, so that an acceptable compromise is achieved with reference to tuning. Conversely, the antenna element 25 may also be designed to be the same length as the antenna element 5, wherein it should then be arranged above or below the other element in the z-direction (see FIG. 2). In order to maintain the forward/reverse relationship, which is achieved by the reflector plate 3, it is advantageous in this context if the two antenna elements 5,25 are arranged somewhat above and below the height H=λ/8.

The feeding point 29 of the other antenna element 25 is arranged with a 90° offset relative to the feeding point 11 of the antenna element 5 thereby achieving a maximum decoupling between the two antenna for receiving and simultaneous transmission. With this arrangement, when both antenna elements 5,25 are used as transmission antennae or as receiving antennae, an antenna of the mobile telephone disposed at any angle to the x-axis and/or y-axis can provide a good coupling factor at least with reference to one of the antenna elements 5,25.

Figure 5:
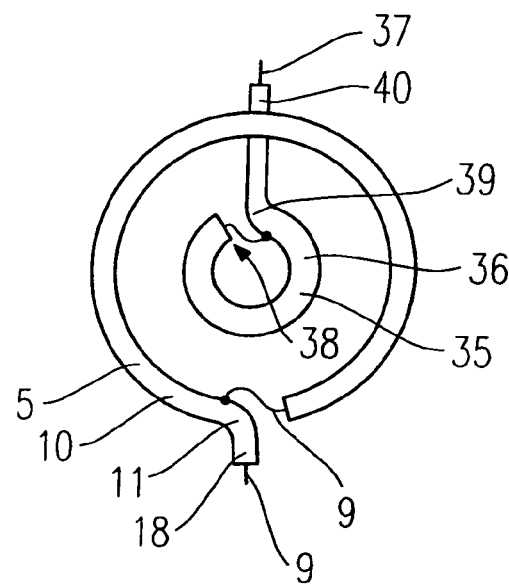
FIG. 5 shows a schematic diagram of two antenna elements according to a third exemplary embodiment of the invention.

FIG. 5 shows a third exemplary embodiment in which the antenna element 5 is provided together with another antenna element 35. The antenna element 5 is structured in the same manner as the antenna element 5 in the first and second exemplary embodiments. The other antenna element 35 also corresponds to the antenna element 5 with reference to its basic structure. Accordingly, it provides an outer conductor 36, an inner conductor 37, the inner conductor 37 emerging from the end 38 and connected to the outer conductor 36 in the region of the feeding point 39, and it also provides a connecting piece 40. However, the developed length of the antenna element 35, corresponds only to approximately half the developed length of the antenna element 5, so that it is tuned for transmission on double the mean frequency. Accordingly, with the antenna element 35, the next highest mode of the transmission signal can be received or transmitted. The connecting pieces 18 and 40 of the two antenna elements 5,35 are therefore rotated through 180° relative to one another. With the two antenna elements 5,35 according to the third exemplary embodiment, a broadband transmission can be achieved by means of the antenna coupler 1.

A frequency separating filter is required to connect the two antenna elements 5,35 to the measuring device 19 by means of the connecting pieces 18,40. The frequency separating filter is connected between the antenna element 5,35 and the measuring device 19.

Figure 6:
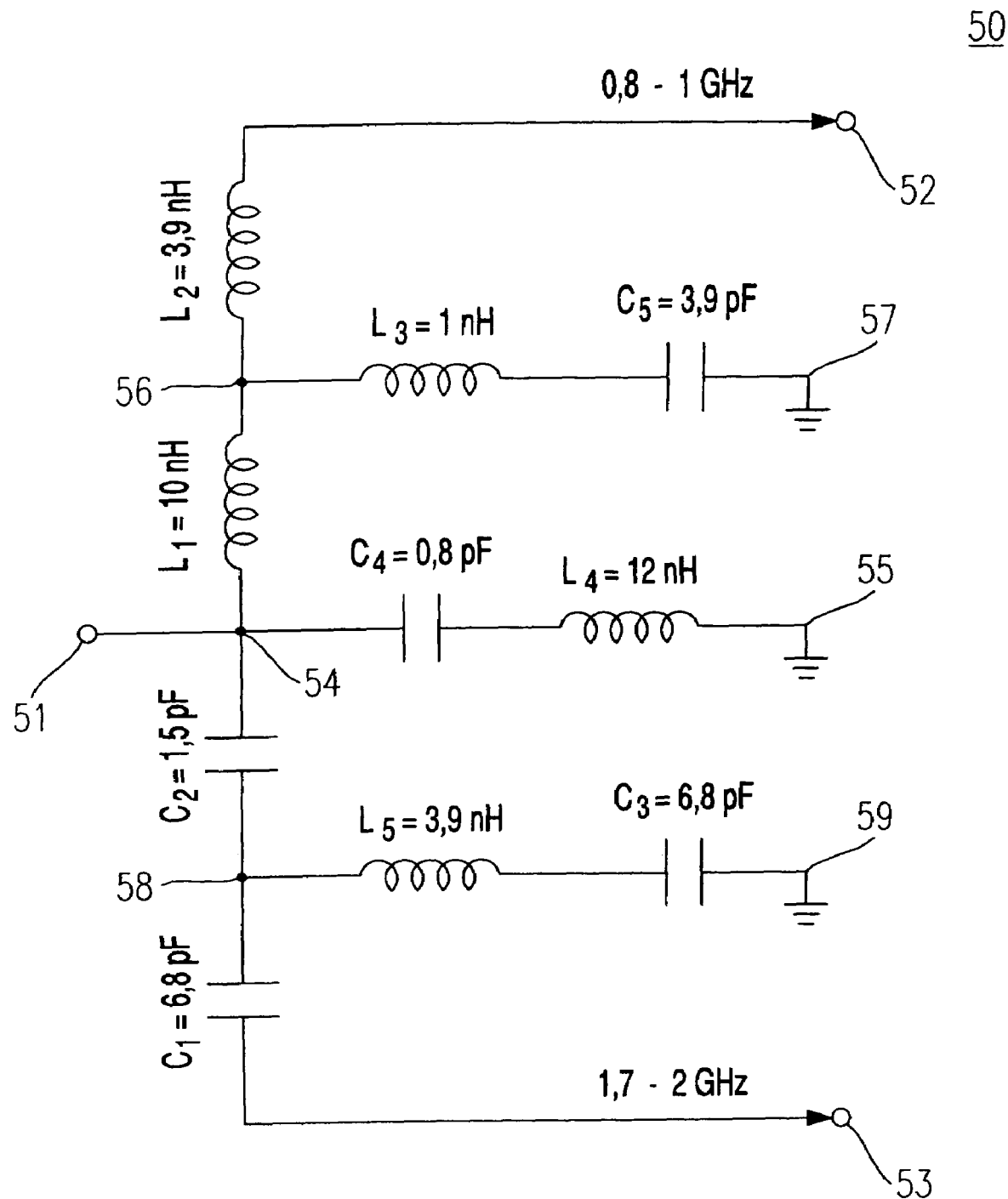
FIG. 6 shows the structure of a frequency separating filter, which can be connected between two antenna elements and a measuring arrangement according to the third exemplary embodiment of the invention.

A frequency separating filter of this kind is shown in FIG. 6. To simplify the diagram, FIG. 6 shows the structural elements provided for the frequency separating filter 50 with actual values. These values are provided only by way of explanation of the preferred exemplary embodiment and, even with reference to the frequency separation achieved, they do not in any sense restrict the invention. The frequency separating filter 50 provides a connecting point 51, a connecting point 52 for a lower frequency branch and a connecting point 53 for an upper frequency branch. The connecting point 51 is connected to a node 54, which is connected to earth 55 via a condenser C4 and coil L4. The node 54 is connected via the coil L1 to the node 56. The node 56 is connected to earth via the coil L3 and the condenser C5, in order to block the upper frequency range, which is located on the side of the connecting point 53. Moreover, the node 56 is connected via the coil L2 to the connecting point 52.

The node 54 is connected via the condenser C2 to the node 58. The node 58 is connected to earth 59 via the coil L5 and the condenser C3, in order to block the lower frequency range which is transmitted via the connecting point 52. The node 58 is also connected via the condenser C1 to the connecting point 53.

By preference, the values for the structural elements according to the third exemplary embodiment are: C1=6.8 pF, C2=1.5 pF, C3=6.8 pF, C4=0.8 pF, C5=3.9 pF, L1=10 nH, L2=3.9 nH, L3=1 nH, L4=12 nH and L5=3.9 nH. With these values, a frequency division of 0.8 GHz to 1 GHz is achieved in the lower frequency branch, which is transmitted via the connecting point 52 with a division of 1.7 GHz to 3 GHz in the upper frequency branch, which is transmitted via the connecting point 53. Within the context of the invention, different values for the structural elements and/or a different frequency division are possible.

In the exemplary embodiments described, the inner conductor 9 of the relevant antenna element runs to the portion of the outer conductor disposed electrically nearest to the feeding point thereby forming an open antenna. However, within the context of the invention, the inner conductor may also run back directly to the outer conductor surrounding it. The inner conductor of the relevant antenna element then runs to the portion of the outer conductor, which is spatially nearest to the inner conductor.

The invention is not restricted to the exemplary embodiments described. In particular, the antenna coupler is suitable for testing any transmitters and/or receivers and/or transmission and/or receiving devices. The testing of mobile telephones represents a preferred application. In the exemplary embodiments described, the mobile telephone 2 is placed on a bearing surface 20 of the receiving element 4 of the antenna coupler 1. The bearing surface 20 in this context may also be designed as the upper side of a housing. It is not absolutely essential, to provide an additional receiving element 4 for a fixed holding of the mobile telephone 2 because the coupling factor achieved is essentially independent of movements in the y-direction and the x-direction. However, it is more advantageous if a defined position of the mobile telephone 2 is provided by means of the receiving element 4 described. The housing is electrically conductive, for example, made from metal, preferably only in the region of the reflector plate. Other regions of the housing can be made from a non-conductive material to avoid reflections, the lateral regions being optionally provided with an absorbing coating.

The invention claimed is:

1. Antenna coupler for testing mobile transmitters and/or receivers, especially mobile telephones, comprising a receiving element and/or a bearing surface for the mobile transmitter and/or receiver and at least one first antenna element, the antenna element being designed as a loop which is at least substantially closed in spatial terms, and the antenna element being arranged substantially in one plane oriented parallel to a reflector plate, on which the receiving element and/or the antenna element is attached.

2. Antenna coupler according to claim 1, wherein the loop of the antenna element is arranged above the reflector plate at a height (H), which corresponds at least substantially to one eighth of the wavelength of the radiation transmitted via the antenna element.

3. Antenna coupler according to claim 1, wherein the antenna element provides an inner conductor and an outer conductor surrounding the inner conductor, wherein the outer conductor shields the inner conductor.

4. Antenna coupler according to claim 3, wherein the inner conductor of the antenna element runs to the outer conductor in the region of the feeding point.

5. Antenna coupler according to claim 4, wherein the inner conductor of the antenna element runs to the portion of the outer conductor disposed electrically nearest to the feeding point thereby forming an open antenna.

6. Antenna coupler according to claim 1, wherein the circumference of the loop of the antenna element is at least substantially equal to the wavelength of the radiation emitted via the antenna element.

7. Antenna coupler according to claim 1, wherein the loop is designed at least substantially in the shape of a ring.

8. Antenna coupler according to claim 1, wherein a second antenna element is provided, which is designed to be suitable for the transmission of approximately double the frequency of the first antenna element.

9. Antenna coupler according to claim 8, wherein the circumference of the loop of the second antenna element is at least substantially equal to half the circumference of the loop of the first antenna element.

10. Antenna coupler according to claim 8 or 9, wherein a frequency separating filter is provided, which is connected between a measuring arrangement and the antenna element.

11. Antenna coupler according to claim 1, wherein a second antenna element is provided, which is designed to be suitable for the transmission of the same frequency as the first antenna element, and that the feeding point of the second antenna element is arranged with a rotational offset relative to the feeding point of the first antenna element.

12. Antenna coupler according to claim 11, wherein the rotational offset is at least substantially 90°.

* * * * *